Aug. 7, 1951 A. V. LORD ET AL 2,563,256

RECEIVER FOR TIME MODULATED ELECTRIC PULSES

Filed July 15, 1946

Inventor
ARTHUR V. LORD
JOHN E. COPE
By Emery, Holcombe & Blair
Attorneys

Patented Aug. 7, 1951

2,563,256

UNITED STATES PATENT OFFICE 2,563,256

RECEIVER FOR TIME MODULATED ELECTRIC PULSES

Arthur Valentine Lord and John Edward Cope, Cambridge, England, assignors to Pye Limited, Cambridge, England, a British company Application July 15, 1946, Serial No. 683,698
In Great Britain July 19, 1945

1 Claim. (Cl. 250—27)

The present invention relates to a receiver for time modulated electric pulses, such as phase or frequency modulated pulses or variable width pulses, either of the single or double pulse type, having an edge which is variable in time.

The present invention consists in a receiver in which the incoming pulses are used to synchronise a relaxation oscillator which is triggered so that it runs at a mean frequency which is simply related to the mean pulse repetition frequency, feeding the output from the relaxation oscillator to an integrating circuit arranged to produce a sawtooth waveform, and feeding the sawtooth output to a low-pass filter which cuts off at approximately the highest modulation frequency required.

One of the difficulties experienced in a receiver for time modulated pulses is to separate the modulation from the mean pulse repetition frequency. It is generally possible to transmit, by a pulse system, modulation frequencies up to half the pulse repetition frequency and highly discriminating filters are necessary in the receiver to separate the modulation from the pulse repetition frequency. The present invention enables this separation to be more easily accomplished since the relaxation oscillator can be run at an integral multiple of the mean repetition frequency of the incoming pulses whereby the waveform fed into the low-pass filter from the integrating circuit will consist mainly of this integral multiple of the pulse repetition frequency and can, therefore, be more easily filtered out from the modulation frequencies in the low-pass filter.

By running the relaxation oscillator at an integral multiple of the mean pulse repetition frequency, the output of the relaxation oscillator consists of pulses which are time modulated in groups, the number of pulses in each group being equal to the multiple of the pulse repetition frequency at which the relaxation oscillator is operating. The output from the integrating circuit consists of a corresponding series of groups of sawtooth pulses having varying amplitudes in accordance with the modulation. In the low-pass filter the multiple of the pulse repetition frequency may be more easily filtered out from the modulation frequencies and the low-pass filter used need not be constructed with such highly discriminating properties as is necessary for filtering the modulation frequencies from the fundamental pulse repetition frequency. The output from the low-pass filter comprises the envelope of the modulated sawtooth waveform.

Figure 1:
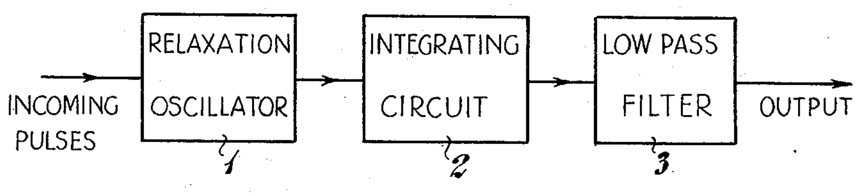
Figure 2:
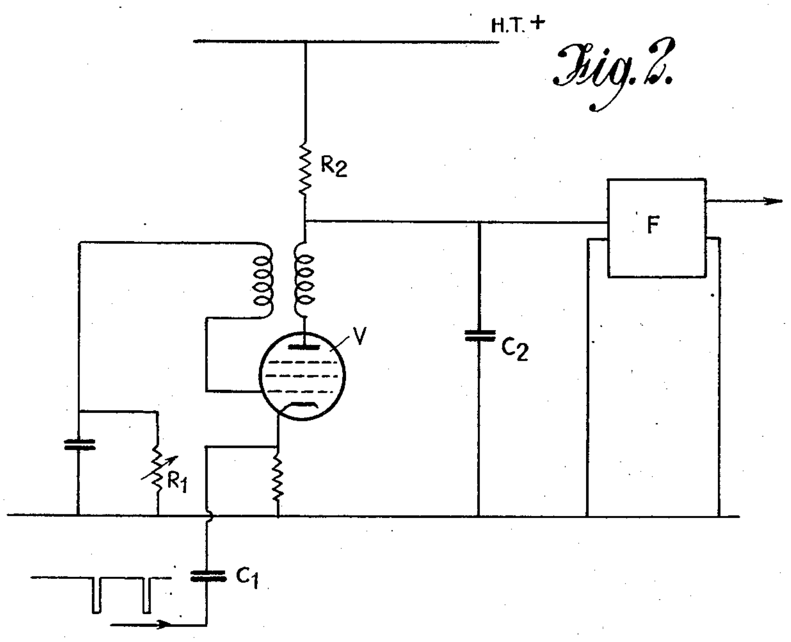

In order that the invention may be more clearly understood, reference will now be made to the accompanying drawings in which Figure 1 shows schematically the circuit arrangement according to the invention;

Figure 2 shows a particular circuit for carrying out the invention.

Referring to Figure 1, according to the present invention the incoming pulses are used to synchronise a relaxation oscillator 1 so that it runs at a mean frequency which is simply related to the mean pulse repetition frequency. The relaxation oscillator is triggered in accordance with the modulation of the incoming pulses. The output from the relaxation oscillator is fed to an integrating circuit 2 which produces a sawtooth waveform, the sawteeth of which are similarly modulated in accordance with the modulation of the incoming pulses. The modulated sawtooth pulses are fed to the low pass filter 3 which cuts off at the highest modulation frequency required.

A detailed circuit arrangement is shown in Figure 2 in which the relaxation oscillator consists of a known type of blocking oscillator comprising the valve V to the cathode of which are fed the incoming pulses through the condenser C1.

The free-running repetition frequency of the blocking oscillator is controlled by the variable resistor R1. The output from the valve V1 is fed to the integrating circuit consisting of the known resistance-condenser arrangement R2, C2, the sawtooth pulses thus produced being fed through the low pass filter F.

The blocking oscillator is preferably adjusted to oscillate at approximately but slightly slower than an integral multiple, say twice, of the mean repetition frequency of the incoming pulses, whereby the waveform fed into the low pass filter from the integrating circuit will consist mainly of this integral multiple of the pulse repetition frequency and can therefore be more easily filtered out from the modulation frequencies in the low pass filter.

The receiver according to the present invention, whether the relaxation oscillator runs at approximately the fundamental pulse repetition frequency or at an integral multiple thereof in order to take advantage of the easier filtering thus rendered possible, can also be used for the amplitude separation of the incoming modulated pulses from a waveform comprising other intelligence for example, from a combined sound and television waveform as described in British patent specification No. 564,511 and copending United States application Serial No. 683,699 filed July 15, 1946. The relaxation oscillator may be designed to trigger only upon receipt of the modulated pulses having an amplitude greater than the remainder of the waveform.

We claim:

A receiver for time modulated electric impulses comprising means for feeding the received modulated pulses to a relaxation oscillator having a free-running frequency which is approximately an integral multiple of and not less than approximately twice the mean repetition frequency of the received pulses, an integrating circuit fed from the output of said relaxation oscillator, and a low-pass filter to which the sawtooth output from the integrating circuit is fed, said low-pass filter having a cut-off at approximately the highest modulation frequency required.

ARTHUR VALENTINE LORD.
JOHN EDWARD COPE.

REFERENCES CITED

The following references are of record in the file of this patent:

UNITED STATES PATENTS

| Number | Name | Date |
|---|---|---|
| 2,188,653 | Faudell | Jan. 30, 1940 |
| 2,282,895 | Shepard | May 12, 1942 |
| 2,297,742 | Campbell | Oct. 6, 1942 |
| 2,323,596 | Hansell | July 6, 1943 |
| 2,413,023 | Young | Dec. 24, 1946 |
| 2,416,305 | Grieg | Feb. 25, 1947 |
| 2,416,306 | Grieg | Feb. 25, 1947 |
| 2,419,547 | Grieg | Apr. 29, 1947 |